United States Patent [19]

Takahashi

[11] Patent Number: 5,483,370
[45] Date of Patent: Jan. 9, 1996

[54] CROSSCONNECT APPARATUS FOR A COHERENT TRANSMISSION SYSTEM

[75] Inventor: Yasushi Takahashi, Hachioji, Japan

[73] Assignee: Hitachi, Ltd., Tokyo, Japan

[21] Appl. No.: 428,455

[22] Filed: Apr. 25, 1995

Related U.S. Application Data

[63] Continuation of Ser. No. 691,849, Apr. 26, 1991, abandoned.

[30] Foreign Application Priority Data

Apr. 27, 1990 [JP] Japan .................................. 2-109996

[51] Int. Cl.$^6$ .................................................. H04J 14/02
[52] U.S. Cl. .......................... 359/128; 359/123; 359/124; 359/181; 359/139
[58] Field of Search ...................................... 359/117, 118, 359/123–124, 128, 135, 139, 158, 165, 181–183, 133

[56] References Cited

U.S. PATENT DOCUMENTS

| | | | |
|---|---|---|---|
| 3,737,584 | 6/1973 | Kaneko et al. .......................... | 370/98 |
| 4,845,703 | 7/1989 | Suzuki .................................... | 359/117 |
| 4,864,649 | 9/1989 | Tajima et al. ........................... | 359/181 |
| 5,005,166 | 4/1991 | Suzuki et al. ........................... | 359/117 |
| 5,018,130 | 5/1991 | Suzuki et al. ........................... | 359/124 |

FOREIGN PATENT DOCUMENTS

| | | |
|---|---|---|
| 3211242A1 | 10/1983 | Germany . |
| 3221942A1 | 12/1983 | Germany . |
| 9101603 | 2/1991 | WIPO .................................... 359/139 |

OTHER PUBLICATIONS

*Electronics Letters,* "New Retiming and Synchronisation Scheme for Optical ATM Switching Systems", Y. Takahashi, et al., 26 (1990) 18 Jan., No. 2, Stevenage, Herts.

*IEEE Communications Magazine,* "A 1.7 Gigabit–per–Second Time–Multiplexed Photonic Switching Experiment", J. R. Erickson, et al., vol 25, No. 5, May 1987, Piscataway, N.J.

*Conference Record, IEEE Global Telecommunications Conference,* "A Photonic Approach to ATM Switching", E. Amada, et al., Nov. 27–30, 1989, vol. 3.

*Conference Record, IEEE International Conference on Communications,* "A Broadband Optical Local Network Based on Multiple Wavelengths and Multiple RF Subcarriers", S. C. Liew, et al., Jun. 11–14, 1989, vol. 1, Boston, Mass.

*IEEE,* "Self–Clocked Optical Control of a Self–Routed Photonic Switch" by P. A. Perrier, et al., Jun. 1989, No. 6, N.Y., N.Y. "Photonic Switching Using Tunable Optical Terminals", by K. Y. Eng. AT&T Bell Laboratories.

*Primary Examiner*—Leo H. Boudreau
*Assistant Examiner*—Kinfe-Michael Negash
*Attorney, Agent, or Firm*—Antonelli, Terry, Stout & Kraus

[57] ABSTRACT

A crossconnect unit which includes a unit for inputting a plurality of coherent signals having a sub-signal added to a main signal after the sub-signal has been modulated by one of a group of modulation methods including a frequency modulation, a phase modulation, an intensity modulation and an amplitude modulation which are different from those applied to the main signal, a wavelength filter for extracting a desired signal from said plurality of coherent signals, a destination decoder for detecting the sub-signal from the extracted signal and extracting destination information, and apparatus for setting a signal path for the extracted signal based on the destination information.

2 Claims, 4 Drawing Sheets

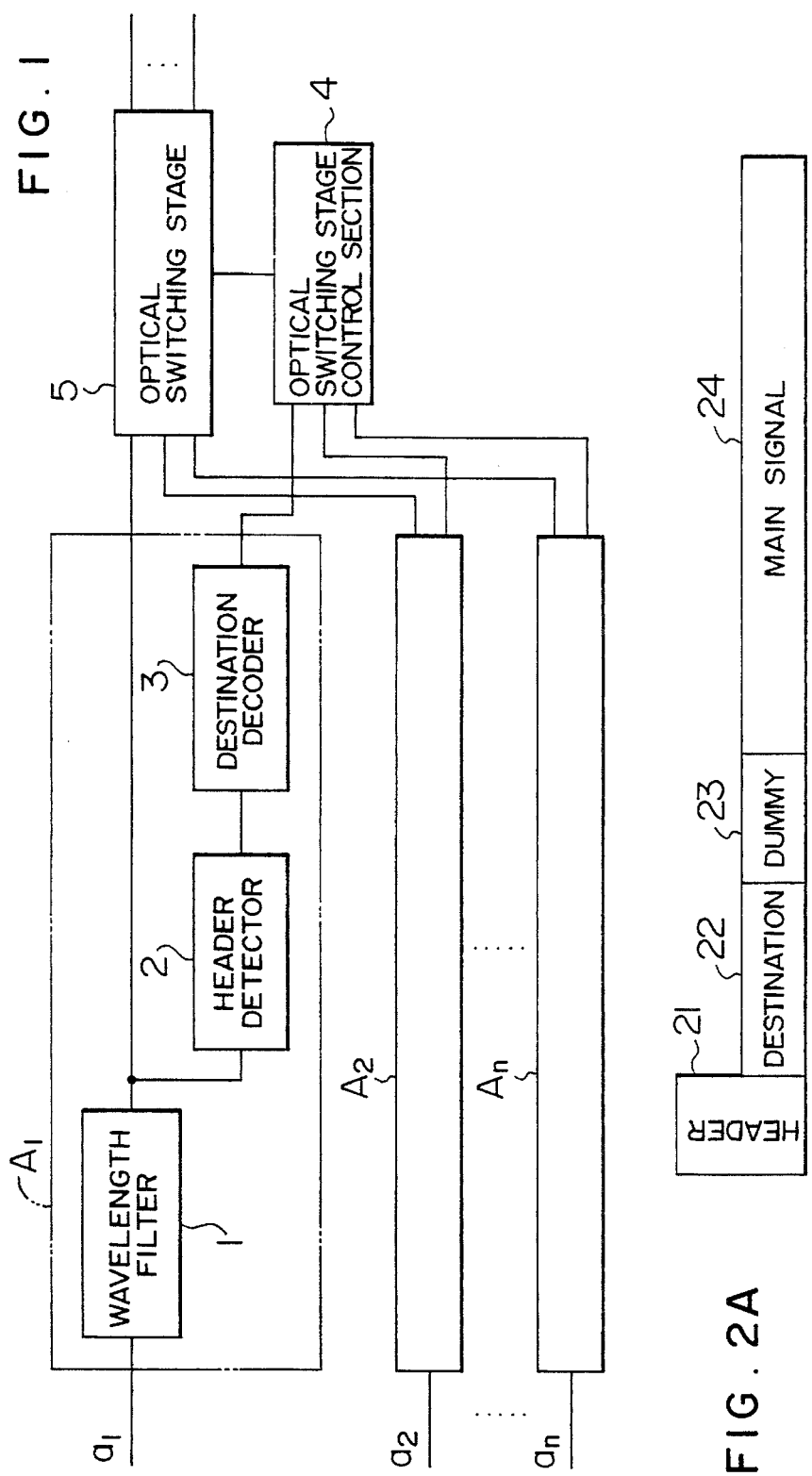

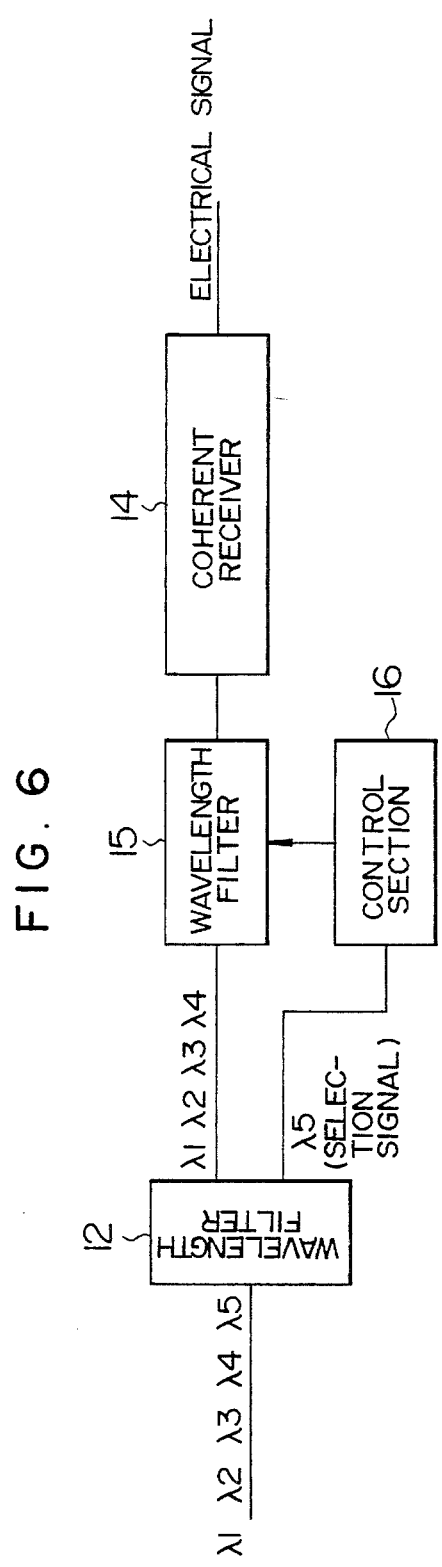

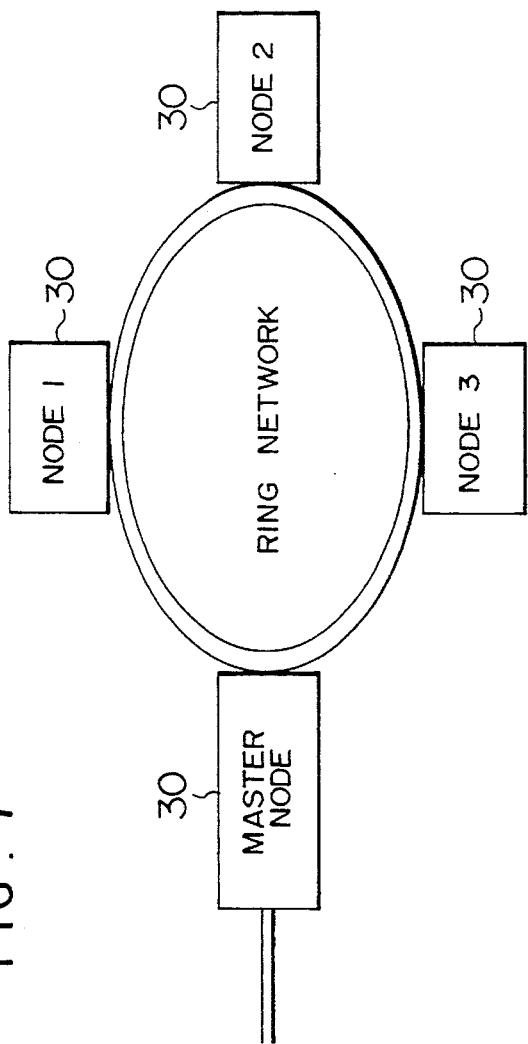
FIG. 7
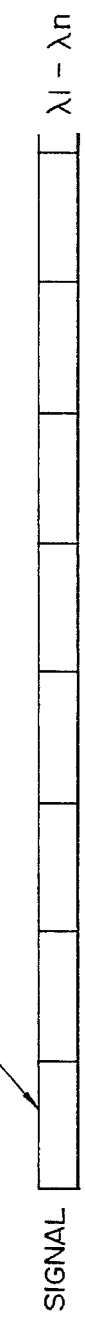
FIG. 8A
FIG. 8B
FIG. 8C 5,483,370

CROSSCONNECT APPARATUS FOR A COHERENT TRANSMISSION SYSTEM

This application is a continuation of application Ser. No. 07/691,849, filed on Apr. 26, 1991 now abandoned.

BACKGROUND OF THE INVENTION

The present invention relates to coherent optical transmission and, more particularly, to an optical transmission format which facilitates switching and crossconnect processings within a communication system.

According to the conventional intensity modulation optical transmission system, the wavelength of a beam does not have an important effect. For example, a change of a wavelength during a transmission period has caused no problem so long as the change is within the range of wavelength reaching a sensitivity range of a receiver. However, according to the coherent optical transmission method, a change of a wavelength in transmission brings about a serious interference in performing normal communication, such as interchannel crosstalks or an erroneous selection of a channel, because optical signals of many wavelengths are multiplexed and transmitted in the coherent optical transmission system. Therefore, unnecessary change of a wavelength should be avoided when a switching processing is carried out in a transmission system. In other words, there may occur a problem unless a wavelength is correctly converted when it becomes necessary to rewrite control information following a switching processing. In order to solve the above problem, it is necessary to arrange such that all the information essential for a switching operation such as attributes of the signal, destinations, etc. is being carried as a sub-signal and the switching operation is carried on based on this sub-signal, with a main signal kept unchanged.

There has been no case that a sub-signal is superposed on a main signal to achieve the above-described purpose in the conventional coherent transmission method. In a system using an intensity modulation, a sub-signal superposing method has been proposed, such as the one described in "Design of Lithium Niobate Based Photonic Switching Systems" by W. A. Payne, et al, IEEE Comm. Magazine, vol. 25, May, 1987, pp. 37–41.

If the above method of using the same modulation system for both the main signal and the sub-signal is directly applied to the coherent transmission method, it becomes necessary to carry out coherent decoding each time when a processing is carried out. Since fine tuning is necessary in stabilizing the wavelength of a receiving signal, coherent decoding will require a complicated structure of the receiver. There is also a risk that a wavelength of the receiving signal is deviated from a correct range, making it difficult to materialize a practical application of the system.

SUMMARY OF THE INVENTION

It is an object of the present invention to provide a coherent transmission method, a crossconnect unit and a switching unit which solve the above described problems.

The above-described problems can be solved by differentiating the modulation system between the main signal and the sub-signal. The sub-signal is modulated by one of a group of modulation methods including a frequency modulation, a phase modulation, an intensity modulation and an amplitude modulation which are different from those applied to the main signal.

For example, when it is assumed that the main signal is frequency modulated, the sub-signal is intensity modulated and the sub-signal is transmitted by power of two to three times larger than that for the main signal, then it is possible to discriminate the header of a receiving signal by a simple look at the level of the receiving signal.

BRIEF DESCRIPTION OF THE DRAWINGS

FIG. 1 is an overall configuration diagram of a first embodiment of the present invention;

FIGS. 2A, 2B, 2C are signal formats of the first embodiment;

FIGS. 5A, 5B, 5C are configuration diagrams of an optical receiver in a third embodiment of the present invention;

FIG. 6 is a signal format in the second and third embodiments;

FIG. 7 is a system configuration diagram in a fourth embodiment of the present invention; and FIGS. 8A, 8B, 8C are transmission formats of a wavelength selection signal in the fourth embodiment.

DESCRIPTION OF THE PREFERRED EMBODIMENTS

Figure 3:
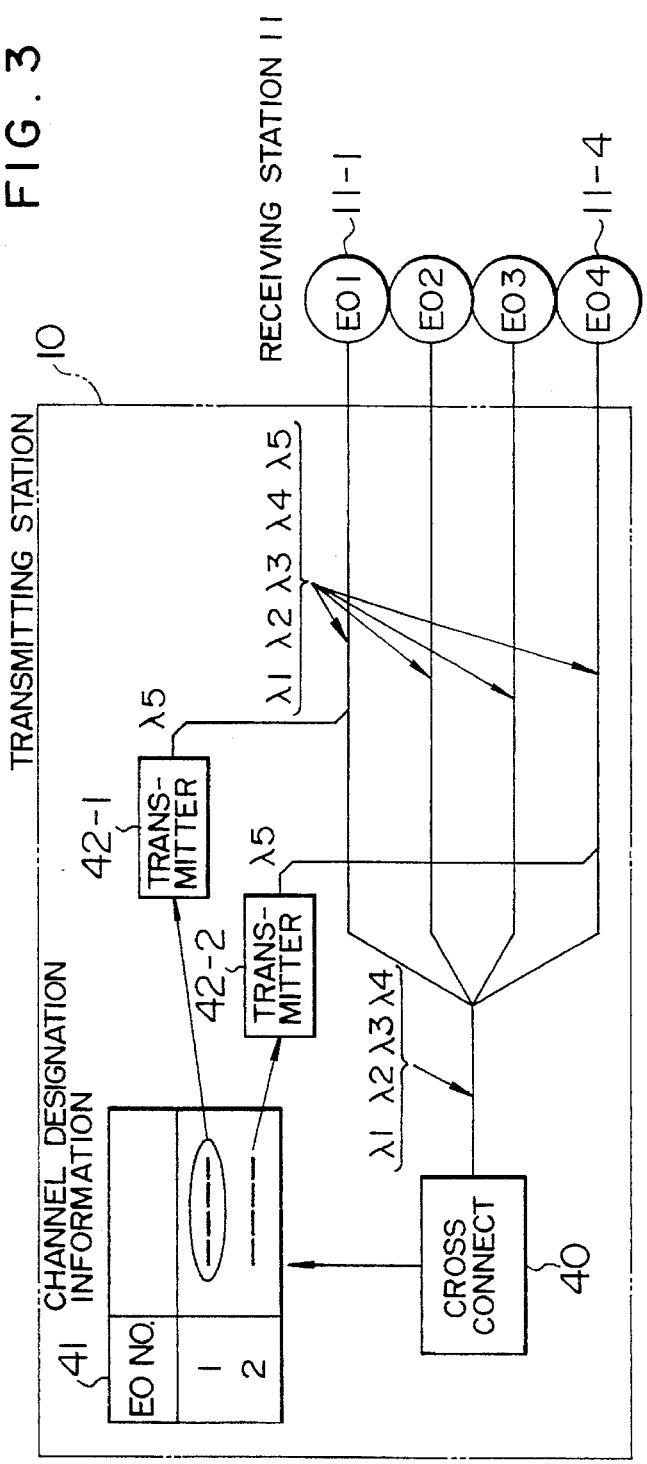
FIG. 3 is a configuration diagram of a second embodiment of the present invention.

One embodiment of the present invention will be explained below in detail with reference to drawings.

FIG. 1 shows an overall configuration of an example of the system in which the present invention is applied to the crossconnect unit. In FIG. 1, blocks $A_1$ to $A_n$ have the identical structures and wavelength multiple beam inputs $a_1$ to $a_n$ are divided into individual waveforms by a wavelength filter 1 at an input port. A header detector 2 detects a header position of an input cell and transmits a signal to a destination decoder 3. The destination decoder 3 knows a position of destination information from this signal and extracts the destination information. Destination information after having been decoded is transmitted to an optical switching stage control section 4 and is used for setting a path of the optical switching stage 5. In this embodiment, the optical switching stage 5 is structured by an optical space switch.

FIG. 2A shows a format of an input optical signal. An intensity modulation signal is used as a signal 21 for showing a cell header position. This signal 21 requires electric power which is about double the size of the power required for a main signal 24. The header position detector 2 can discriminate a header position by checking only an input level. Destination signal 22 is similarly coded and intensity modulated, added next to the signal 21 showing a cell header position. A dummy signal 23 next to the destination signal 22 is a guard time for preventing an input signal from being dropped when the optical switching stage 5 is replaced. The destination decoder 3 transmits a destination signal 22 shown in FIG. 2B to the optical switching stage control section 4 after decoding the destination, and the optical switching stage control section 4 outputs a path change-over signal 25 shown in FIG. 2C to the optical switching stage 5, to set a path. In this case, the guard time mentioned above is set to be longer than the delay time of the setting of a path and the switching time of the optical switching stage 5 so that the rearrangement time of the optical switching stage 5 can be accommodated within the guard time.

With the above-described arrangement of the present embodiment, the configuration of the input port can be simplified without causing any change in the wavelength of the main signal 24.

FIG. 3 shows the system configuration of the second embodiment. According to this embodiment, a transmitting station transmits signals for specifying wavelengths of signals to be received by receiving stations by multiplexing wavelengths of the signals, and the receiving stations decode signals to be received by each station based on the information of the designated wavelengths. According to the conventional method, a transmitting station selects signals to be transmitted to individual receiving stations and transmits these signals by allocating these signals so that each receiving station receives only a signal which is destined to the concerned station. This is the so-called crossconnect method, which requires switching of transmission signals and thus incurs an increase in the quantity of hardware of a crossconnect unit 40 at the transmitting station. In the mean time, when all the wavelength multiplexed signals are to be distributed to each receiving station, each receiving station needs to have a control system for deciding whether each of the signals has been destined to the own station or not and receiving a signal if the decision is such that the signal is destined to the own station. This decision needs to be taken at high speed. However, it is difficult to realize this high-speed logical circuit and, mainly for this reason, a processing time cannot be reduced. In order to solve the above problems, the present embodiment has an object of simplifying the crossconnect unit of the transmitting station and communication control of the receiving station. A crossconnect unit 40 at the transmitting station decides a destination of a transmitting signal. In other words, the crossconnect unit 40 decides wavelength of signals to be received by respective receiving stations. This information is collected for each receiving station as channel designation information 41, and the result is transmitted to each receiving station by using optical transmitters 42-1 to 42-4 having wavelengths separate from the wavelengths for transmitting transmission signals. In other words, as shown in FIG. 3, the same optical signal is transmitted from a transmitting station 10 to a plurality of receiving station 11-1 to 11-n in wavelengths of $\lambda_1$ to $\lambda_4$. At the same time, information of the wavelength to be selected by each receiving station is transmitted to respective receiving stations in a wavelength of $\lambda_5$. Each receiving station selectively receives only an optical signal of the wavelength to be received based on the channel designation information. By having the above arrangement, the conventional crossconnect function can be realized.

Figure 4:
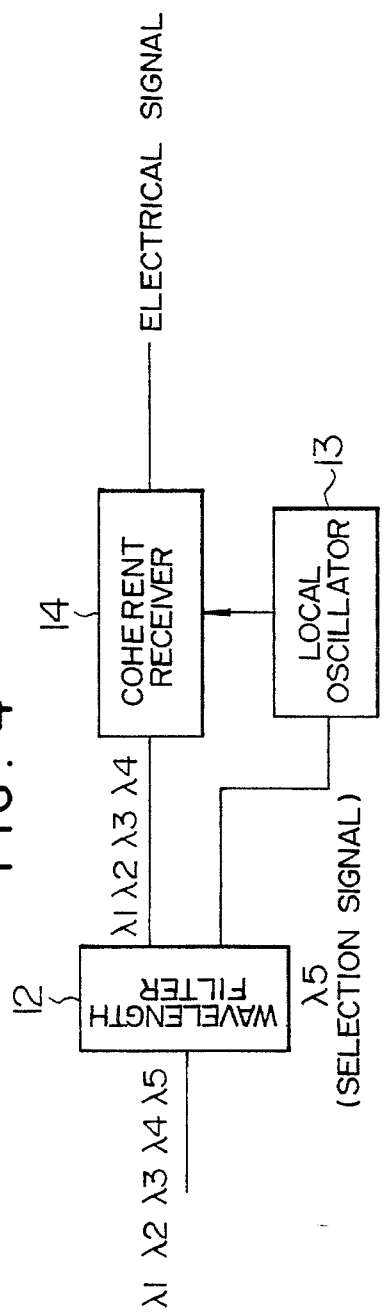
FIG. 4 is a configuration diagram of an optical receiver in the second embodiment.

FIG. 4 shows the configuration of the optical receiver at a receiving station. A wavelength filter 12 separates the information of the wavelength (wavelength $\lambda_5$) to be selected from the optical signals having the wavelengths $\lambda_1$ to $\lambda_4$. Based on the information of the wavelengths to be selected (that is, in the order of $\lambda_2$, $\lambda_1$ and $\lambda_3$ in this example), the wavelength of a local oscillator 13 is set and a signal of a required waveform is decoded by a coherent receiver 14. In this case, information of the wavelength to be selected is synchronous with the cell of the receiving signal and the wavelength of a local oscillator 13 varies for each cell. However, it takes time for the wavelength of the local oscillator 13 to stabilize. Dummy data included in the receiving signal is used to stabilize the wavelength.

FIGS. 5A to 5C show signal formats in the present embodiment. Among these figures, FIGS. 5A and 5B show frame formats of transmission signals. Dummy signals in this case have the same contents as those of the dummy signals shown in FIG. 2. FIG. 5C shows a transmission frame of the wavelength $\lambda_5$ for transmitting channel designation information. Information to be received is designated for each frame cycle of each transmission signal. In the present examples, it is designated that the signal of $\lambda_2$ is received first and then the signal of $\lambda_1$ is received, followed by the signal of $\lambda_3$.

According to the present embodiment, it is not necessary to decide whether a signal is destined to own station or not based on destination information included in a main signal or a sub-signal. Therefore, it is possible to make a quick decision.

FIG. 6 shows a configuration of the optical receiver in the third embodiment of the present invention. The overall structure is the same as that in FIG. 3. In the present embodiment, a variable wavelength filter 15 is used instead of a local oscillator at the receiving station. A wavelength filter 12 separates the information of the wavelength (wavelength $\lambda_5$) to be separated from the optical signals having the wavelengths $\lambda_1$ to $\lambda_4$. Based on the information of the wavelength to be selected, a control section 16 sets a selected wavelength of a variable wavelength filter 15 and decodes a signal of the required wavelength by a coherent receiver 14. The signal format is the same as that in FIG. 5.

FIG. 7 shows an embodiment in which the network has a ring shape. As shown in FIG. 7, a master mode 30 and modes 1 to 3 are connected to the ring network respectively. The ring network has the same function as that of the embodiment shown in FIG. 3. However, because of the ring shape of the network, the network transmits the information of the wavelength to be selected by multiplexing the information as shown in FIGS. 8A to 8C.

FIG. 8A shows a transmission signal frame which has the same structure as that of FIG. 5A. FIG. 8B shows signal frames for transmitting channel designation information in the present embodiment. In the present example, the nodes 1 to 3 receive signals. All the channel designation information shown in FIG. 8C is transmitted to the signal frames shown in FIG. 8B by time-sharing multiplexing the information. In other words, in the first frame of the transmission signal shown in FIG. 8A, the node 1 should select a waveform 3, the node 3 should select a waveform 6 and the node 3 should select a waveform 3. In the first frame of the selection signal shown in FIG. 8B, information to be received by the nodes 1, 2 and 3 is multiplexed in the sequence of the nodes as the waveforms to be selected (in this case, the wavelength 3, the wavelength 6 and the wavelength 3). Each node extracts the channel designation information corresponding to each own node from the frame of the selection signal and selects a wavelength from the transmission signal based on the extracted channel designation information. A wavelength is selected by the receiver having the structure shown in FIG. 4 or FIG. 6.

According to the present invention, it is possible to carry out a crossconnect processing or the like without changing the wavelength of the main signal.

I claim:

1. A crossconnect apparatus comprising:
   means for inputting a plurality of coherent signals, each including a main signal and a sub-signal placed before said main signal, said sub-signal being modulated by one of a group of modulation methods including a frequency modulation, a phase modulation, an intensity modulation and an amplitude modulation which are different from those applied to the main signal;

a wavelength filter, coupled to said inputting means, for extracting a desired signal from said plurality of coherent signals;

a header detector, coupled to said wavelength filter, for detecting said sub-signal from said extracted signal;

a destination decoder, coupled to said header detector, for extracting destination information from said sub-signal; and an optical switching stage controller, coupled to said destination decoder, for setting a signal path for said extracted signal based on said destination information.

2. A crossconnect apparatus according to claim 1, wherein said sub-signal includes a dummy signal as a guard time for permitting the changing over of an optical switch.

* * * * *